Nov. 29, 1955 L. S. HOLMBOE 2,724,890
METHOD OF MAKING SHORE CLAMPS
Filed May 3, 1951
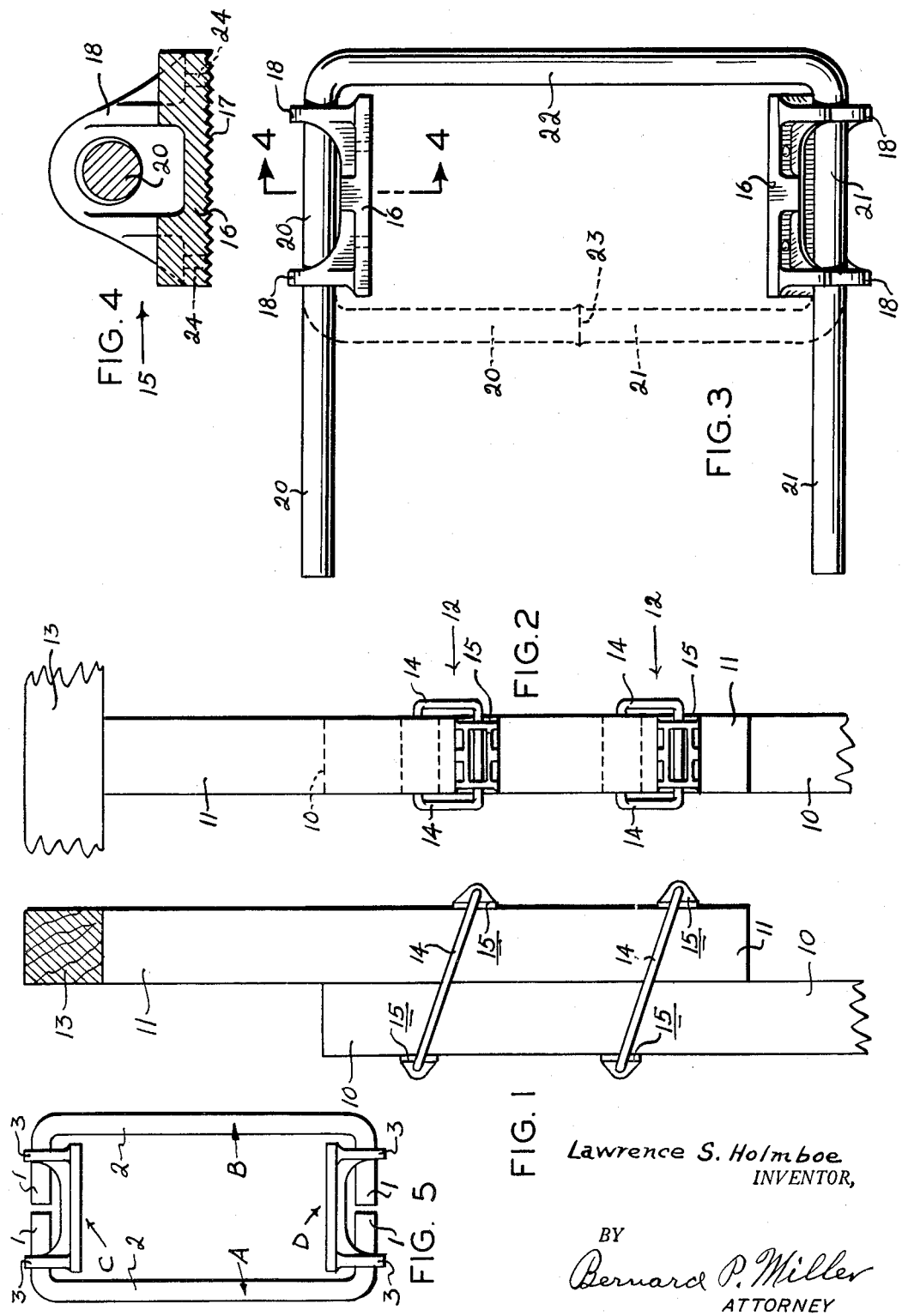
Lawrence S. Holmboe
INVENTOR,
BY Bernard P. Miller
ATTORNEY

United States Patent Office 2,724,890
Patented Nov. 29, 1955

2,724,890

METHOD OF MAKING SHORE CLAMPS

Lawrence S. Holmboe, Oklahoma City, Okla.

Application May 3, 1951, Serial No. 224,273

2 Claims. (Cl. 29—150)

The present invention relates generally to building construction, and more particularly to form shoring, scaffold and tower erection, or other types of temporary frame erection needed during the construction of a building.

The present invention is an improvement over U. S. patent numbered 1,932,072, which was issued to me on October 24, 1933.

The principal object of the present invention is to provide an improved method of making a stirrup or clamp for retaining two vertical shore members in side to side overlapped relation, so that the two members may complementally act as a single weight supporting post. The device, disclosed and claimed in the above mentioned patent, is formed out of an endless substantially rectangular metal loop or collar, each end portion of which pivotally supports a shore engaging shoe or plate. In manufacturing and assembling the loop and plates a problem arises in getting the plates in proper position, and then closing the loop and making it endless.

The assembly was originally accomplished by forming two identical substantially U-shaped elements out of rod-stock, inserting the ends of the elements through the ears of two clamping members so that the similarly located ends of the elements face each other in close proximity, and then welding the adjacent ends of the elements together to form a closed loop. That method was found impractical, because the proximity of the clamping members to the two welds, would cause the member to draw the heat from the rod-stock and result in an imperfect weld-integration of the abutted ends. It was further found difficult to hold the U-shaped members in proper alignment during the welding operation.

The clamp of the present invention is designed for assembly in a manner which precludes the possibility of any mis-mating, and in such a manner that only one welded joint is needed. This single weld joint is so located, that longitudinal stresses exerted in use on the sides of the loop, will place the joint under tension instead of exerting a prying force thereon.

Other objects will be apparent from the following description when taken in conjunction with the accompanying single sheet of drawings, wherein:

Figure 1 is side elevational view of two shore timbers which are anchored together by two clamps of the present invention;

Figure 2 is an elevational view of the timbers shown in Fig. 1, but looking at the right hand face thereof;

Figure 3 is an enlarged side elevational view of one of the shore clamps, the solid lines showing the loop member partially formed, and the dotted lines illustrating the completed loop;

Figure 4 is a vertical sectional view taken substantially along the line 4—4 of Fig. 3; and, Figure 5 is a diagrammatic plan view illustrating the prior art clamp assembly method.

Like characters of reference designate like parts in those figures of the drawings in which they occur.

Referring now more particularly to Fig. 5 of the drawings, wherein is illustrated a prior art method of assembling a shore clamp, the reference characters A and B indicate two identical substantially U-shaped steel rod members, each having two short extents or legs 1, and a longer leg 2 perpendicular to the short legs and connecting the same together. The reference characters C and D indicate two identical plates or shoes, each having a pair of spaced and alignedly perforated ears 3.

In assembling the parts A, B, C and D to form a shore clamp, the members A and B were reversed in position, as shown, with the ears of each shoe C engaged over the adjacent short legs 1 of the rod members A and B, and with the ears of the shoe D being engaged over the other short legs 1 of the rod members A and B. The then adjacent ends of the two rods were next welded together at the two spaces indicated, so as to form an endless rectangular loop of the U-shaped rods A and B.

It may readily be seen that such an assembly method necessitates two welding operations, and that the welds must be made in close proximity to the shoes or clamping plates C. It is also obvious that in order to form the loop perfectly, the two rods A and B must be accurately and positively positioned during the welding operations.

It is also obvious that with the welded joints positioned at the spaces indicated, any stress exerted on the loop in directions tending to farther separate from each other, the united legs 1 at opposite ends of the loop, will act to create prying forces at the two joints.

The clamp of the present invention is illustrated in Figs. 1 to 4 inclusive of the drawing, wherein:

The reference numeral 10 indicates a lower or bottom shore member or timber which in cross-section is preferably four inches square. The reference numeral 11 indicates an upper or top shore member or timber of similar cross-sectional dimensions.

The clamp of the present invention is indicated, as a whole, by the reference numeral 12, and is designed to hold the two shore members 10 and 11 in flat face to face contact with each other, and to anchor the shore member 11 against downward longitudinal movement with relation to the lower shore member 10. When thus anchored together, the two members 10 and 11 complementally act to form a post for supporting any weight or load 13.

The clamps 12 of the present invention, per se, are each composed of a substantially rectangular loop 14, made of steel rod material, and two clamping plates or shoes 15 pivotally carried by the end extents of the loop 14.

The two shoes 15 are identical, and each one is composed of an elongated rectangular metal body 16 having a flat serrated bearing surface 17, and an opposite back surface which is provided with two spaced apart upstanding ears 18 which are parallel to each other, and which are alignedly perforated transversely.

In forming the rectangular loop 14 with the shoes 15 confined upon the end extents thereof, a single piece of steel rod-material is first bent to form a substantially square cornered U-member, as shown clearly in Fig. 3 of the drawing. The U-member provides two parallel leg portions 20 and 21 and a connecting portion 22 at right angle thereto. The connecting portion 22 is of a length to properly form one side of the finished loop 14, and the legs 20 and 21 are each of a length equal substantially to the length of one end of the loop 14, plus one-half the length of the loop's other side.

With the U-member thus formed, the leg 20 is inserted through the ears, or outwardly projecting means with aligned bore openings, 18 of one of the shoes 15, and the leg 21 is similarly inserted through the ears of the other shoe 15. The two shoes are then moved or slid along their respective legs to points adjacent the portion 22, as shown in Fig. 3. With the shoes thus positioned, the free end portions of the legs 20 and 21 are bent toward each into axial alignment with each other so as to form the other side of the loop 14. The dotted lines of Fig. 3 depict the final positions of said free end portions. The bending operation brings the two leg ends into abutting relation, and they are thereupon welded together as indicated by a weld line 23.

The shore clamp of the present invention functions in a manner similar to that of my former patent. The two shore members 10 and 11 are merely inserted side by side into the loops of two of the clamps 12, as best illustrated in Fig. 1. The serrated faces 17 of the shoes 15 are placed against the outer side surfaces of the shore members, and frictionally engage said surfaces to prevent downward movement of the upper timber 11 along the lower timber 10.

The shoe bodies 16 are provided with through perforations 24 through which nails may be inserted to attach one of the shoes to one of the timbers.

Obviously the invention is susceptible to some change or alteration without defeating its practicability, and I therefore do not wish to be confined to the preferred embodiment shown in the drawings and described herein, further than I am limited by the scope of the appended claims.

I claim:

1. The method of making a shore clamp comprising the steps of providing a pair of clamping shoes each having a rectangular substantially flat bearing surface and a spaced pair of parallel outwardly projecting alignedly perforated ears disposed on the opposite surface thereof; providing a rod of metal of substantially uniform cross section and predetermined length; bending the rod at two points substantially one-third its length from each end to form a substantially U-shape having free parallel legs perpendicular to the intermediate and substantially one-third portion; pivotally mounting one of said clamping shoes on each of said legs adjacent the substantially one-third intermediate portion by extending the respective leg through the perforations in one of said pairs of ears; then bending the free end portions of said legs at right angles to bring their extreme end surfaces into abutting relation and thereby forming a rectangular looped rod lying in a common plane; and finally welding together said end surfaces.

2. The method of making a shore clamp comprising the steps of providing a pair of metal clamping shoes each having an elongated substantially flat bearing surface and outwardly projecting means on the opposite surface thereof formed with aligned bore openings; providing a rod of metal of substantially uniform cross section and predetermined length; bending the rod at two points substantially one-third its length from each end to form a substantially U-shape having free parallel legs perpendicular to the intermediate and substantially one-third portion; pivotally mounting one of said clamping shoes on each of said legs adjacent the substantially one-third intermediate portion by extending the respective leg through the aligned bore openings of one of said outwardly projecting means; bending the free end portion of each of said legs at right angles to bring the extreme end surfaces thereof into axially aligned abutting relation and thereby forming a rectangular looped rod lying in a common plane; and finally integrally joining said abutted ends.

References Cited in the file of this patent

UNITED STATES PATENTS

| Number | Name | Date |
|---|---|---|
| 434,532 | Thomson | Aug. 19, 1890 |
| 1,932,072 | Holmboe | Oct. 24, 1933 |
| 2,042,740 | Smith | June 2, 1936 |
| 2,059,225 | Gallagher | Nov. 3, 1936 |
| 2,535,626 | Cottrell | Dec. 26, 1950 |